UNITED STATES PATENT OFFICE.

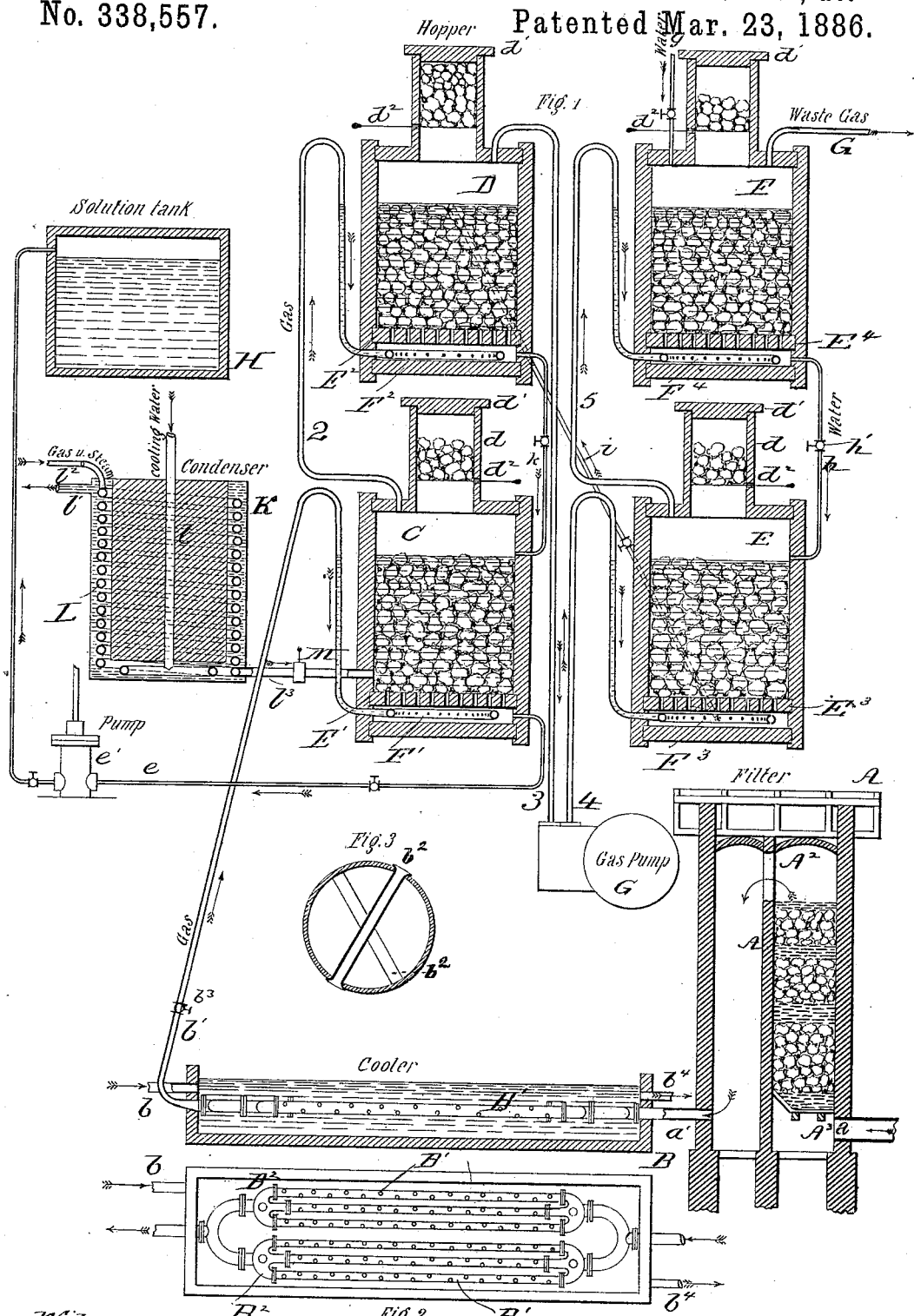

EUGEN BARON RITTER AND CHARLES KELLNER, OF GOERZ, AUSTRIA-HUNGARY, ASSIGNORS TO WILLIAM A. RUSSELL, TRUSTEE, OF LAWRENCE, MASSACHUSETTS.

APPARATUS FOR THE MANUFACTURE OF SULPHUROUS ACID, &c.

SPECIFICATION forming part of Letters Patent No. 338,557, dated March 23, 1886.

Application filed March 2, 1885. Serial No. 157,520. (No model.)

*To all whom it may concern:*

Be it known that we, EUGEN BARON RITTER and CHARLES KELLNER, subjects of the Emperor of Austria-Hungary, and residents of Goerz, in the Empire of Austria-Hungary, have invented certain new and useful Improvements in Apparatus for the Manufacture of Sulphurous-Acid Solutions, &c., of which the following is a specification.

Sulphurous-acid solutions, sulphites, and bisulphites have heretofore been manufactured by conducting sulphurous-acid gas directly from the generating apparatus to a tower containing limestone, dolomite, or other alkaline earth, over which a stream of water trickled from above while the gas entered at the bottom of the tower in a heated condition, and, ascending through the spaces between the particles of the alkaline earth, met the water descending through the same and combined therewith.

In the production of bisulphite-of-lime solution another method employed is to force the air into closed retorts containing burning sulphur, the gas so generated being cooled and then forced into a solution of lime.

Our present invention has relation to an apparatus for the manufacture of sulphurous-acid solutions and salts and for the regaining of the sulphite solutions used in the manufacture of cellulose.

This invention has for its object, first, the provision of means for filtering the sulphurous acid, and thereby removing the finely-divided substances—such as flowers of sulphur, arsenic acid, &c., held in suspension therein; second, the provision of means for the removal of the traces of sulphuric acid which always accompany the sulphurous-acid gas when it leaves the generator; third, the provision of means for thoroughly cooling the gases before their passage through the apparatus where the absorption takes place; fourth, the provision of means for producing the chemical combination of the cooled and purified gas with water and the desired base; fifth, the provision of means for regaining of the sulphurous acid blown off with the steam from the digesters used in the manufacture of cellulose.

It may be here remarked that our apparatus in its entirety is adapted and designed to be used as a means of producing pure sulphurous-acid solutions, salts, sulphites, bisulphites, or, in fact, for the production of any chemical combination of sulphurous-acid gas with an alkaline base and a liquid where the sulphurous-acid gas is taken directly from the pyrites-furnace or other apparatus in which it may be generated, certain parts of the apparatus being adapted to be used for the regaining of sulphurous-acid gas held in suspension in steam.

Our invention consists, first, in the provision of means for filtering the sulphurous-acid gas as it comes direct from the apparatus in which it is generated; secondly, in the provision of means for removing the traces of sulphuric acid from the sulphurous-acid gas; thirdly, in the provision of means for producing the chemical combination of the filtered and cooled gas with the desired base and liquid; and, fourthly, in the peculiar construction, combination, and arrangement of parts hereinafter described and claimed.

In an application for Letters Patent of the United States filed by us the 2d day of March, 1885, Serial No. 157,520½, relating to a process for the manufacture of sulphurous-acid solutions, we have described and shown, but have not claimed, the apparatus constituting the subject-matter of our present application.

Referring to the accompanying drawings, Figure 1 is a vertical transverse section of the entire apparatus; Fig. 2, a cross-section of one of the pipes through which the gas passes in the cooling apparatus, and Fig. 3 a plan view of the cooling apparatus complete.

The apparatus which we propose to employ, and have illustrated in the accompanying drawings, may be said to consist of three independent parts which have communication with one another by means of suitable pipes, and operate in conjunction to produce the desired result. These parts are a filtering apparatus, a device for cooling the gas, and the apparatus for the production of the solution. The latter portion of our invention—i. e., the apparatus for the production of the solution—is capable of being used independently of the cooling and filtering device for the production of solutions or salts and for the regaining of sulphurous acid from the vapor and steam let off from the digesters used in the production of sulphite cellulose, and in the drawings we have illustrated an apparatus for cooling and condensing the sulphurous acid and steam as they come from the digesters employed in the production of cellulose preparatory to their entrance into the regaining apparatus, the filtering and cooling devices which are employed when the gas is led directly from the pyrites-furnace or other generator being cut off from communication with the regaining apparatus, for the reason that their employment in this connection is unnecessary, as the sulphurous-acid gas held in suspension in the steam and coming from the cellulose-digesters is in a pure condition.

We will first describe the different parts of the apparatus and their operation as used where the gas is conducted directly from the generator, and will afterward describe the manner in which the apparatus is used in regaining the sulphurous-acid gas from the steam in which it is held in suspension when led from the digesters used in the production of cellulose.

In the drawings, A designates a chamber divided into two compartments by a division-wall, A', which has an opening, A², at the top for the passage of the gas from one chamber to the other. Near the bottom of the first chamber is arranged a grating, A³, upon top of which is placed a layer of any substance not acted upon by sulphuric acid—as coke, broken china or earthenware, granite, or quartz—and upon top of this layer is placed a layer of limestone. Upon top of the limestone a layer of the substance first used, and so on alternately until the chamber is filled up to the top of the dividing-wall A'. A pipe, $a$, leads into the first chamber below the grating A³, and serves to conduct the gas into the said chamber, and a pipe, $a'$, leads from the bottom or near the bottom of the second chamber to the cooling apparatus. This cooling apparatus consists of a rectangular box or open tank, B, having water inlet and outlet pipes $b^4$ $b$, as shown.

Within the box or tank B is placed a series of pipes, B' B' B', joined together at their ends by caps B², which are in turn connected, respectively, to the pipe $a'$, leading from the filtering apparatus, and to a pipe, $b'$, leading to the chamber or tank in which the combination of the gas with the desired base takes place. The pipes B' B' B' all communicate directly with the inlet-pipe $a'$ and outlet-pipe, $b'$, and each of them is provided with small transverse pipes $b^2$ $b^2$, communicating at each end with water which surrounds the pipes B' B' B', and serving to divide and mix the gas passing through the pipes B' B' B' and to afford additional cooling-surface. One of the pipes B' is shown in section at Fig. 3 of the drawings, and its particular construction will be readily understood by an inspection of the figure. The tank B is kept full of water, which is constantly changing, passing into the tank at one end through the pipe $b$ and out of the other through the pipe $b^4$. The gas passing through the pipes B' B' in opposite direction to the direction of the passage of the water through the tank, leaving the cooling apparatus at or about the same temperature as that of the water.

Referring now to the upper portion of the figure which illustrates the apparatus for combining the cooled and purified sulphurous-acid gas with the desired base and liquid, it will be observed that we employ four boxes or tanks, C D E F, of similar construction. These boxes or tanks are made, preferably, of wood, and may be lined with lead, and are adapted to contain the carbonate, hydrate, or oxide of the base, and also the liquid which forms the solution. Each of the boxes has a hopper, $d$, having a lid, $d'$, and a gate, $d^2$, which hoppers contain a supply of the base from whence the boxes C D E F may be replenished from time to time, as required, without interrupting the continuity of the process of formation of the solution.

Gratings E' E² E³ E⁴ are fixed near the bottoms of each of the tanks C D E F, forming supplemental perforated bottoms to the same, and upon top of these gratings is placed the material which is to form the base of the solution. Beneath each of the gratings E' E² E³ E⁴ is placed a perforated coil of pipe, F' F² F³ F⁴, into which the gas is forced in succession, and from whence it passes up through the gratings.

G designates a gas-pump or other equivalent forcing and sucking apparatus by means of which the gas is drawn and forced through the entire apparatus, as will be presently described.

We have shown the tanks C D E F as being arranged two above and two below a horizontal line, and we prefer this arrangement for the number of tanks shown; but the number of tanks and their relative arrangement may be varied to any degree without departure from the spirit of our invention. A reservoir for the reception of the solution is provided, and is connected to the bottom of the tank C by a pipe, $e$, a pump, $e'$, serving to elevate the solution to said reservoir.

The apparatus being charged with the requisite material and the gas-pump G put in operation, the gas is drawn from the pyrites-furnace or other source of supply into the first chamber, and, ascending through the limestone and coke, the flowers of sulphur, arsenic acid, &c., is deposited upon the coke or broken stone, and the sulphuric acid combines with the limestone, which latter remains active for a long time, as each atom of the sulphuric acid uniting with the limestone sets free one atom of carbonic acid, by reason of which the sulphate coating becomes extremely porous. After passing through the first compartment the gas, now freed from dust and sulphuric acid, passes over the division-wall A', and descending through the second compartment goes to the cooling apparatus through the pipe $a'$. After passing through the cooling apparatus the gas emerges through the pipe $b'$. Said pipe extends up above the level of the top of the tank C, and is bent down alongside of the tank and enters the same below the grating E', and is connected to or made continuous with the perforated and coiled pipe F', so as to cause the gas to be distributed evenly throughout the tank. The gas, after passing up through the alkaline earth or other substance on top of the grating E' and through the solution already in the tank, passes off through a pipe, 2, which leads from the top of the tank C to the coiled pipe $F^2$ in the second tank, D. The pipe 2, before entering the tank D, is led up above the level of the top of said tank and down again, so as to form a water-trap, and thereby preventing the liquid contents of said tank from passing back through the pipe, and the same arrangement is made with the other gas-pipes, 3, 4, and 5, and for the same purpose. After leaving the tank D the gas proceeds by way of a pipe, 3, to the gas-pump G, and, leaving the pump G, through pipe 4, enters at the bottom of the third tank, E, where it is distributed by the coil $F^3$ and arises through the grating $E^3$ and the contents of the tank E. After passing through the tank E the gas passes to the tank F through pipe 5, and after passing through the tank F in the same manner as through the other tanks of the residual gases—such as nitrogen and carbonic-acid gas—pass off into the air through a waste-pipe, 6. The water, which with the base and the gas forms the desired solution, takes the opposite course through the tanks to that of the gas. Entering the fourth tank, F, through a pipe, $g$, it passes down over the dolomite or other substance in the tank and through the perforated bottom or grating $E^4$ fills the tank and passes out through a pipe, $h$, which is provided with a suitable valve, $h'$, to the tank E. Entering the tank E at the top, the water passes down through the same and is led from the bottom of this tank to the top of the second tank, D, by way of a diagonal pipe, $i$. Passing down through the tank D, the water goes to the tank C through a pipe, $k$, and, passing through this tank, it finally emerges in the form of the desired solution by way of a pipe, $e$, through which it is led to the reservoir H. Valves and cocks are provided at intervals in the water-pipes so as to regulate the flow of the water.

It will be noticed that the gas passes through each of the tanks C D E F in succession from bottom to top, and that the water pursues the opposite course. The process being a continuous one, there is no necessity for removing the alkaline earth or other substance from the tank.

When desired or deemed expedient, the contents of the tanks may be replaced or replenished through the hoppers $d$.

The apparatus is exceedingly simple in construction and operation, and renders easy the expeditious and economical production of the desired solution.

Having described the entire apparatus as arranged for the production of the desired solution when the gas is brought direct from the pyrites-furnace or other source of supply, we will now proceed to describe the manner in which a portion of the apparatus is to be used for the reclaiming of sulphurous acid from the steam in which it is held in suspension after having been used in the manufacture of cellulose.

On the left-hand side of the tank C in the drawings is to be seen a tank, K, having an inlet-pipe, $l$, that enters at the top and reaches nearly to the bottom of said tank. The tank K is formed with double walls and bottom, forming a water-space with an outlet for the water at top $l'$, and within the water-space and between the double walls a coil of pipe, L, is placed, having an inlet, $l^2$, and an outlet, $l^3$, which communicates directly with the first tank, C, of the series C D E F. A stop-cock, M, is placed on the pipe $l^3$ so as to cut off communication with the tank C when desired. The pipe $b'$, leading from the cooling-pipes B' B' B', is also provided with a stop-cock, $b^3$, as are also the various pipes for the conveyance of water through the tanks C D E F.

The tank K and its appurtenant parts is intended for use only where the sulphurous acid is to be regained from the steam in which it is held in suspension after having been employed in the manufacture of cellulose, and when so used communication between the tanks C D E F and the cooling-pipes and filtering-chamber is cut off.

The tanks C D E F, together with the cooling and filtering apparatus, are also capable of being employed in the sugar industry, when of course communication with the filtering and cooling apparatus is maintained, the dolomite or other material being removed from the tanks C D E F and the said tanks being filled with a sugar liquid.

Having fully described our apparatus and its operation, we claim—

1. In an apparatus for the production of compounds of sulphurous acid with other substances, the combination, with the combining apparatus and a suitable source of supply from whence sulphurous-acid gas may be derived, of a chamber containing a solid material acted upon by sulphuric acid and a solid material not acted upon by acids, whereby the sulphurous acid before entering the combining apparatus is filtered and purified, substantially as described.

2. In an apparatus for the production of sulphurous-acid solutions or salts, the combination of a chamber containing materials for the filtration of particles held in suspension in the gas and a material adapted to combine with and absorb the sulphuric acid accompanying the gas, a cooling apparatus, and a series of tanks or boxes containing a base and a liquid, the whole being connected by suitable pipes and provided with a gas-pump, whereby the gas is caused to pass from the generator through the filtering, the cooling, and the combining apparatus in succession, substantially as described.

3. In an apparatus for the production of sulphurous-acid solutions or salts, the combination, with the combining apparatus, of the cooling-tank B, having water inlet and outlet, and the pipes B' B' B', arranged in said tank and connected to the gas-inlet $a'$ and outlet $b'$, and having the transversely-arranged pipes $b^2$ $b^2$, substantially as described.

4. In an apparatus for the production of sulphuric-acid solutions, the combination, with a suitable generating apparatus, of the filtering and purifying chamber A, provided with the division-wall A' and the grating $A^3$, upon which are placed alternate layers of limestone or other material adapted to combine with sulphuric acid, and coke or other substance not acted upon by acid, substantially as and for the purpose described.

In testimony that we claim the foregoing as our invention we have signed our names, in presence of two witnesses, this 24th day of January, 1885.

EUGEN BARON RITTER.
CHARLES KELLNER.

Witnesses:
GEORG MARTIN,
GRAZIADIO LUZZATTO.